3,248,856
PROCESS FOR FILLING COLUMNS FOR SEPA-
RATION BY GASEOUS CHROMATOGRAPHY
Claude Guillemin, Paris, and Georges Wetroff, Le Thillay,
Seine-et-Oise, France, assignors to Produits Chimiques
Pechiney-Saint-Gobain, Neuilly-sur-Seine, France
No Drawing. Filed May 27, 1963, Ser. No. 283,559
Claims priority, application France, June 7, 1962,
900,072
8 Claims. (Cl. 55—67)

This invention relates to gaseous chromatography and more particularly to a process for loading columns used in gaseous chromatography for increasing the efficiency of the columns, especially when used in preparative chemistry.

The technique of separation by gaseous chromatography consists in processing through capillaries or pipes filled with granular material, a gaseous carrier containing a mixture of chemical compounds which it is desired to separate into its constituents.

The excellent results that are capable of being obtained by gaseous chromatography in analytical chemistry where very small quantities of material are processed through the columns cannot easily be obtained when the columns are increased in diameter in the attempt to increase the capacity in order to adapt the analytical process for use with a greater quantity of material for purposes of making more material available for study as well as to transpose the analytical process into a production process for making such materials available in larger quantities for use or as a raw material in chemical synthesis. The inability to obtain excellent results with such larger columns for larger capacity stems mainly from the heterogeneity for loading the columns and the greater difficulty in obtaining a desirable thermal balance through the cross-section of the column from the axis to its external or outer peripheral portion.

To alleviate the problem of heterogeneity, processes have been proposed for heating the column while pouring the packing or lining at a definite speed; or vibrating the column during or subsequent to loading; or by pouring in the load or lining slowly without vibration.

Such techniques depend greatly upon the skill of the operator and are incapable of being accomplished easily, quickly or consistently. Notwithstanding every precaution which might be taken, the same number of theoretical plates are incapable of being obtained with a column of large diameter by comparison with a column of the same length but of smaller diameter and the difficulty of obtaining thermal stability and uniformity still remains.

It is an object of this invention to produce a column for gaseous chromatography wherein use is made of a column of larger diameter for greater capacity without depreciating its value as a means for effective separation of chemical compounds into constituents and without being faced by the drawbacks heretofore experienced with the increase in the diameter of the columns, as previously described.

The objects of this invention are achieved, in accordance with the broad concepts of this invention, by first making use of a gaseous stream through the column having a speed sufficient to fluidize the lining or packing and then decreasing the rate of flow of the gaseous medium through the column to form the lining or packing into a relatively fixed bed which becomes characterized by properties free of the difficulties experienced with fixed bed systems heretofore employed.

The bed produced in accordance with the practice of this invention differs by comparison with a fixed bed that is formed simply by filling the column in that the column produced in accordance with the practice of this invention is characterized by a very low amount of packing in a high degree of homogeneity for the distribution of particles of different size when compared with columns packed with processes heretofore employed, whereby the change in flow of the carrier gas is proportional to the radius of the filled column, more favorably to influence the height of the theoretical plate.

Further, the low loading of the packing obtained in accordance with the practice of this invention operates to enhance radial distribution to minimize temperature differential across the column and to improve the overall efficiency of the packed column.

It has been found that columns filled or packed in accordance with the practice of this invention are capable of maintaining their efficiency in use over a relatively long period of time, depending somewhat upon the amount of vibration and the type of vibration to which the column is exposed in use and it has been found further that the efficiency of the column can be recovered or revived by repetition of the process to again fluidize the packing or lining and reforming the relatively fixed bed by adjustment of the rate of flow of the gaseous stream therethrough.

A further concept of this invention resides in the ability to stabilize the packing or filling in the most favorable state substantially immediately after fluidization. For this purpose, the packing or filling material can be formulated of a substance capable of being lightly sintered at a more or less high temperature to effect an interbonding between the particles whereby they are maintained in a stabilized state. Instead, the packing or filling material can be formulated to contain a small amount, such as a few percent, of a material that sinters at a reasonable elevated temperature, such as a low fusion point mineral, or an organic material which, upon heating, leaves a small amount of binder to increase the coherence of the filling or packing without materially affecting the porosity or contact surface, or else use can be made of a small amount of material having slightly adhesive characteristics.

In accordance with the preferred practice of this invention, the gas used as a carrier for the chromatographic separation can be the same as the gas used for fluidization of the filling or packing material, the difference residing in the rate of flow through the column whereby the gas is caused to flow at high rate through the column for fluidization of the packing or filling material and then gradually reduced in the rate of flow for use in the gaseous chromatography with corresponding conversion of the fluidized packing or filling material to form a relatively fixed bed having the greater efficiencies described. It is desirable also to make use of a gas for fluidization which is heated to a temperature corresponding to about that for the gaseous chromatography thereby to facilitate the maintenance of more constant and uniform temperature through the cross-section of the column. Thus the efficiency of the column is maintained from one operation to another.

The following is an example of the practice of this invention in the preparation of a column and in the use thereof in gaseous chromatography. It will be understood that the example hereinafter set forth is given by way of illustration, and not by way of limitation.

*Example 1*

Use is made of a vertical column formed of stainless steel tubing having an internal diameter of 6 cm. and a length of 1 m.

The column is filled with 1255 grams of a granular material in the form of roasted diatomaceous earth, of the type marketed under the trade name "Chromosorb P" and dimensioned to pass through sieves 29 and 27 (Norme Afnor).

The steady phase is in the form of an organo silicon fluid such as ethyl and methyl or ethyl methyl polysiloxane of low molecular weight (about 200 MW), such as DC–200 fluid, marketed by Dow Corning Corporation of Midland, Michigan, and which is applied to the granular diatomaceous earth in an amount corresponding to about 20% by weight thereof.

The lower portion of the column is fitted with a foraminous grid on which the packing is supported and a 20° C. angled cone for use as an injection nozzle for the fluidizing and carrying gas.

The treated diatomaceous earth filling or packing material is first introduced into the column by well known means and then nitrogen, preheated to a temperature of about 40° C., is injected at a rate of 1500 liters per hour for a few minutes to form the filling material into a fluidized bed. Thereafter, the flow rate of the nitrogen gas is reduced gradually to about 250 liters per hour with the result that the filling material settles from a fluidized state into a relatively fixed bed having a density which, when measured during several trials, is found to fall within the range of 0.443 to 0.453. Separation is effected of a mixture of 1.2 cm.³ of pentane and hexane present in substantially equal parts by weight in the carrier gas. For each trial and when based upon hexane, according to the obtained chromatograms, the number of corresponding theoretical plates for the column is calculated in accordance with the classical formula set forth in "Gas Chromatography," of A.I.M. Keulemans. Values ranging from 303 to 330 are obtained.

After fluidization, the column reaches an efficiency of over 300 plates per meter with a reproducibility of better than 8%.

By comparison, the same one meter column of the same diameter, packed with the same materials by processes heretofore employed, gives a value of 225 theoretical plates per meter in processing the same materials, in the same amounts and at the same rate, with other working conditions being substantially the same. Thus a column prepared in accordance with the practice of this invention and embodying the features of this invention provides an increase in efficiency in the order of about 40% by comparison with columns packed in accordance with the processes which might heretofore have been employed.

It will be understood that changes may be made in the details of construction, arrangement and operation, without departing from the spirit of the invention, especially as defined in the following claims.

We claim:
1. A process for loading gaseous chromatographic columns of large diameter with a filling material in particulate form to provide a packing of high homogeneity comprising introducing the full complement of chromatographic filling material into the column, passing a gaseous current into the column upwardly through the filling material in the column at a high velocity sufficient to fluidize the material, thereafter reducing the rate of gaseous flow upwardly through the filling material in the column by an amount to allow the filling material gradually to settle in the column into a relatively fixed bed of high homogeneity through which the gaseous carrier containing the mixture of chemical compounds to be processed is advanced for separation, and passing said carrier gas containing said mixture of chemical compounds through said settled column.

2. The process as claimed in claim 1 in which the gaseous component for fluidization is the same as the gaseous carrier used in the gaseous chromatographic process.

3. The process as claimed in claim 1 in which the gaseous component for fluidization is gradually reduced in speed of flow from the flow rate of fluidization to the flow rate used in the gaseous chromatographic process.

4. The process as claimed in claim 1 which includes the step of heating the gaseous component prior to introduction into the column for fluidization of the material.

5. The process as claimed in claim 4 in which the gaseous component is heated to a temperature corresponding to about that used in the gaseous chromatographic process.

6. The process as claimed in claim 1 in which the filling material is of a type which will cohere when heated to elevated temperature and which includes the step of heating the material to elevated temperature following fluidization and settling to set the filling material in the column.

7. The process as claimed in claim 6 in which the filling material is a sinterable material and wherein the heating step comprises heating to sintering temperature.

8. The process as claimed in claim 6 in which the filling material contains a binder component in admixture therewith which is activated at elevated temperature.

References Cited by the Examiner

UNITED STATES PATENTS

| | | | |
|---|---|---|---|
| 2,875,847 | 3/1959 | Pring | 55—61 |
| 3,005,514 | 10/1961 | Cole et al. | 55—386 |
| 3,047,992 | 8/1962 | Jones. | |

REUBEN FRIEDMAN, *Primary Examiner.*

C. N. HART, *Assistant Examiner.*